United States Patent
Cahoy et al.

(10) Patent No.: US 12,179,942 B2
(45) Date of Patent: Dec. 31, 2024

(54) LOCALIZING, WAKING-UP, AND ESTIMATING DIRECTION OF FEMTO-SATELLITES

(71) Applicant: Massachusetts Institute of Technology, Cambridge, MA (US)

(72) Inventors: Kerri Cahoy, Concord, MA (US); Christian Haughwout, Clinton, CT (US); Paul Serra, Boston, MA (US); Ruonan Han, Cambridge, MA (US); Anantha Chandrakasan, Natick, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 18/558,021

(22) PCT Filed: May 3, 2022

(86) PCT No.: PCT/US2022/027491
§ 371 (c)(1),
(2) Date: Oct. 30, 2023

(87) PCT Pub. No.: WO2023/282964
PCT Pub. Date: Jan. 12, 2023

(65) Prior Publication Data
US 2024/0262538 A1    Aug. 8, 2024

Related U.S. Application Data

(60) Provisional application No. 63/183,314, filed on May 3, 2021.

(51) Int. Cl.
*B64G 3/00*    (2006.01)
*B64G 1/10*    (2006.01)
(Continued)

(52) U.S. Cl.
CPC ............. *B64G 3/00* (2013.01); *B64G 1/1085* (2013.01); *G01S 1/70* (2013.01); *G01S 5/16* (2013.01); *B64G 1/44* (2013.01); *G01S 17/74* (2013.01)

(58) Field of Classification Search
CPC ........... B64G 3/00; B64G 1/1085; G01S 5/16; G01S 17/74
(Continued)

(56) References Cited

U.S. PATENT DOCUMENTS

| | | | | | |
|---|---|---|---|---|---|
| 5,527,001 | A | * | 6/1996 | Stuart | B64G 1/66 244/172.6 |
| 5,641,135 | A | * | 6/1997 | Stuart | B64G 1/44 244/172.6 |

(Continued)

FOREIGN PATENT DOCUMENTS

| | | | | |
|---|---|---|---|---|
| CN | 104135322 B | | 2/2017 | |
| EP | 1582461 A1 | * | 10/2005 | ............... B64G 1/24 |

(Continued)

OTHER PUBLICATIONS

Barnhart et al., "A low-cost femtosatellite to enable distributed space missions," Acta Astronautica, vol. 64, Issues 11-12, Jun.-Jul. 2009, 15 pages.

(Continued)

*Primary Examiner* — Nuzhat Pervin
(74) *Attorney, Agent, or Firm* — Smith Baluch LLP

(57) ABSTRACT

Femto-satellites are very small satellites that can be deployed in constellations from a larger mothership satellite for distributed measurement. They are too small to accommodate the GNSS receivers that many satellites use for navigation, but they can be located with an electromagnetic beam from the mothership satellite. The mothership satellite scans this beam across a constellation of femto-satellites.

(Continued)

When the beam scans across a particular femto-satellite, the femto-satellite transmits an acknowledgement to the mothership satellite, e.g., by retroreflecting the beam or via a separate radio link. The beam can be modulated with commands for the femto-satellite, such as to make a measurement or transmit previously acquired data, as well with commands for determining the femto-satellite's location, such as a time stamp or beam pointing information. The femto-satellite can determine its location from the information modulated onto the beam or transmit the time stamp to the mothership satellite for localization.

20 Claims, 6 Drawing Sheets

(51) Int. Cl.
  *B64G 1/44* (2006.01)
  *G01S 1/70* (2006.01)
  *G01S 5/16* (2006.01)
  *G01S 17/74* (2006.01)
(58) Field of Classification Search
  USPC .......................................................... 342/54
  See application file for complete search history.

(56) References Cited

U.S. PATENT DOCUMENTS

| | | | | |
|---|---|---|---|---|
| 5,752,676 | A * | 5/1998 | Shapira | B64G 1/443 244/172.7 |
| 5,787,336 | A * | 7/1998 | Hirschfield | H04B 7/18543 455/103 |
| 5,806,801 | A * | 9/1998 | Steffy | B64G 1/242 244/172.6 |
| 6,474,602 | B1 * | 11/2002 | Mcvey | B64G 1/24 244/172.6 |
| 8,437,892 | B1 * | 5/2013 | Hope | B64G 1/244 701/13 |
| 8,463,467 | B2 * | 6/2013 | Mehlen | G01S 5/0247 701/13 |
| 8,802,966 | B2 * | 8/2014 | Dunlap | F24S 20/20 136/246 |
| 9,608,716 | B1 * | 3/2017 | Elwailly | H04B 17/40 |
| 9,621,850 | B1 * | 4/2017 | Mitchell | H04B 7/18508 |
| 11,368,212 | B2 * | 6/2022 | Kalita | B64G 1/24 |
| 11,375,341 | B2 * | 6/2022 | Markhovsky | G01S 5/12 |
| 11,840,498 | B2 * | 12/2023 | Reedy | C07C 259/06 |
| 2009/0324236 | A1 * | 12/2009 | Wu | H04B 10/118 398/122 |
| 2011/0160939 | A1 * | 6/2011 | Mehlen | B64G 1/242 701/13 |
| 2013/0140916 | A1 * | 6/2013 | Dunlap | F24S 23/30 307/149 |
| 2013/0263441 | A1 * | 10/2013 | Boncyk | H02J 7/0068 320/101 |
| 2014/0263844 | A1 * | 9/2014 | Cook, Jr. | B64G 1/66 343/705 |
| 2016/0033649 | A1 * | 2/2016 | Mathews | G01S 19/246 342/357.48 |
| 2017/0043886 | A1 * | 2/2017 | Cook | H01Q 15/161 |
| 2017/0141849 | A1 * | 5/2017 | Thangavelautham | H04B 10/118 |
| 2017/0183108 | A1 * | 6/2017 | Cuilleron | B64G 1/283 |
| 2017/0272149 | A1 * | 9/2017 | Michaels | G01S 5/0081 |
| 2018/0265224 | A1 * | 9/2018 | Foulds | B64G 1/428 |
| 2018/0269130 | A1 * | 9/2018 | Ejeckam | H01L 29/2003 |
| 2018/0278322 | A1 * | 9/2018 | Mengwasser | G01S 5/0249 |
| 2019/0326774 | A1 * | 10/2019 | Moellenberg | H02S 50/00 |
| 2020/0024012 | A1 * | 1/2020 | Fortezza | G01S 19/28 |
| 2020/0091994 | A1 * | 3/2020 | Kalita | H04B 10/503 |
| 2021/0339890 | A1 * | 11/2021 | Reedy | B64G 1/405 |
| 2022/0127018 | A1 * | 4/2022 | Fukushima | B64G 1/66 |
| 2023/0040954 | A1 * | 2/2023 | Hayashi | B64G 1/28 |
| 2024/0025569 | A1 * | 1/2024 | Dunford | B64G 1/58 |

FOREIGN PATENT DOCUMENTS

| | | | | |
|---|---|---|---|---|
| EP | 2639523 | A1 * | 9/2013 | .............. F24S 20/20 |
| WO | 2016154944 | A1 | 10/2016 | |

OTHER PUBLICATIONS

Choudhari et al., TabSat: Theoretical Design Approach of Distributed Femto satellite system for forest fire monitoring. Society for Space Education Research & Development Oct. 2020. 133 pages.
Hu et al. "Development of a 10g femto-satellite with active attitude control." In: 17th Reinventing Space Conference, Belfast, Northern Ireland, Nov. 12-14, 2019. 8 pages.
International Search Report and Written Opinion in International Application No. PCT/US2022/027491 mailed Apr. 13, 2023, 20 pages.
Kamte, Microwave-based navigation of femtosatellites using on-off keying. The University of Texas at Arlington, 2014, 121 pages.
Manchester et al., "KickSat: A low-cost femtosatellite to enable distributed space missions," 27th Annual AIAA/USU Conference on Small Satellites, 2013, 9 pages.
Manchester, "Centimeter-scale spacecraft: Design, fabrication, and deployment." (2015). 186 pages.
Morales. A multi-agent payload management approach for femtosatellite applications. MS thesis. Universitat Politècnica de Catalunya, 2011, 113 pages.
Perez et al., "Orbit Determination of Femtosatellites Used in Planetary Exploration Missions." Poster 2016. 1 page.
State-of-the-Art Small Spacecraft Technology. NASA Oct. 2021. 428 pages.
Tristancho Implementation of a femto-satellite and a mini-launcher for the N Prize. MS thesis. Universitat Politècnica de Catalunya, 2010, 89 pages.

* cited by examiner

LOCALIZING, WAKING-UP, AND ESTIMATING DIRECTION OF FEMTO-SATELLITES

CROSS-REFERENCE TO RELATED APPLICATION(S)

This application is a national-stage application, under 35 U.S.C. 371, of International Application No. PCT/US2022/027491, filed on May 3, 2022, which in turn claims the priority benefit, under 35 U.S.C. 119(e), of U.S. Application No. 63/183,314, filed on May 3, 2021, each of which is incorporated herein by reference in its entirety for all purposes.

BACKGROUND

Femto-satellites (spacecraft with wet masses below 100 grams) are the subject of intense and growing interest within the new space community. The low mass, and corresponding low cost per free-flying spacecraft deployed, make femto-satellites particularly promising as a platform for making measurements that benefit from high spatial diversity. The small size of femto-satellites does complicate certain tasks, particularly localization. In this context, localization is the process of determining the spatial location of a spacecraft and being able to correlate measurements of other physical observables to a known point in space. Larger spacecraft typically make use of a global navigation satellite system (GNSS), such as the American Global Positioning System (GPS) constellation, the Russian GLONASS constellation, the European Galileo constellation, or the Chinese Beidou constellation, to determine their position in space. This is difficult on femto-satellites because most GNSS receivers are so large, so heavy (e.g., 30 grams or more), and consume so much power relative to the femto-satellites themselves.

There are at least two approaches to localizing femto-satellites utilizing radio signals from the femto-satellites themselves. The first approach relies on Doppler measurements made by a mothership spacecraft. Unfortunately, these Doppler measurements produce large errors in estimated position and velocity (e.g., about 5 km position error in the trivial case of a perfectly circular orbit). Additionally, Doppler measurements require continuous tracking for an extended period of time to obtain position knowledge. This requires the femto-satellite to transmit radio waves continuously for a long period of time, which can be difficult for power reasons.

The second localization approach inverts how a GPS constellation works. (GPS produces distance measurements between the receiver and several satellites whose positions are known extremely well, and then calculates the receiver's location based its distance from at least four known points.) This uses a large ground station network (many receivers on the ground in geographically diverse locations) and a femto-satellite with a radio powerful enough to be heard by a large number of receivers in that network. The femto-satellite broadcasts a navigation beacon that is detected by at least four receivers at different known positions. This can be challenging because of excessive power consumption by the radio on the femto-satellite and the potential need for a large number of receivers. Additionally, it may be difficult to localize a large number of femto-satellites using this approach because the femto-satellites do not have a robust way to synchronize with each other and may transmit their navigation signals at the same time, making it difficult to distinguish the different femto-satellites at the receivers.

SUMMARY

Particularly for missions involving femto-satellites with high spatial diversity, accurate localization is critical to obtaining high value measurements, and thus an improved localization system that is compatible with femto-satellite size, weight, and power (SWaP) limitations is desired. This localization can be achieved by scanning, by the spacecraft, an electromagnetic beam across a portion of outer space containing a femto-satellite. If the electromagnetic beam is an optical beam, for example, the solar cell may detect it with a solar cell and filter an output of the solar cell.

The spacecraft receives a radio-frequency (RF) signal from the femto-satellite in response to the femto-satellite detecting the electromagnetic beam. This RF signal indicates when the femto-satellite detected the electromagnetic beam. The position of the femto-satellite relative to the spacecraft can then be estimated based on a pointing angle of the electromagnetic beam when the femto-satellite detected the electromagnetic beam. The distance from the spacecraft to the femto-satellite can be estimated based on a time of flight of the electromagnetic beam to the femto-satellite.

A femto-satellite can also detect an electromagnetic beam (e.g., an optical, terahertz, or RF beam) scanned by a spacecraft across a portion of outer space containing the femto-satellite. This electromagnetic beam may be modulated with information encoding a pointing angle of the electromagnetic beam with respect to the spacecraft. In this case, the femto-satellite can determine its position with respect to the spacecraft based on the information encoding the pointing angle of the electromagnetic beam with respect to the spacecraft.

Such a femto-satellite can include a solar cell array, filters, and circuitry. In operation, the solar cell array converts incident solar radiation into direct current (DC) components and converts an electromagnetic beam from a spacecraft into alternating current (AC) components. The filters, which are operably coupled to respective solar cells in the solar cell arrays, separate the DC components from the AC components. And the circuitry, which is operably coupled to the filters, detects the AC components. The circuitry also activates at least one electronic component of the femto-satellite in response to the solar cell array receiving the electromagnetic beam from the spacecraft. For example, the electronic component can be a radio to transmit an acknowledgement of the electromagnetic beam to the spacecraft or a sensor to make a measurement in response to the electromagnetic beam. The circuitry can estimate a bearing from the femto-satellite to the spacecraft based on the AC components. The femto-satellite may also include a retroreflector to retroreflect at least a portion of the electromagnetic beam back to the spacecraft.

A method of operating a femto-satellite can include receiving, by a solar cell array on the femto-satellite, an electromagnetic beam scanned by a spacecraft across a portion of outer space containing the femto-satellite. The femto-satellite can activate at least one electronic component in response to the solar cell array receiving the electromagnetic beam. It can also transmit an acknowledgement of the electromagnetic beam to the spacecraft. Transmitting the acknowledgement can include retroreflecting at least a portion of the electromagnetic beam to the spacecraft and/or transmitting a radio-frequency signal, a terahertz signal, or an optical signal from the femto-satellite to the spacecraft. And the femto-satellite can actuate a sensor in response to the solar cell array receiving the electromagnetic beam.

A bearing from the femto-satellite to the spacecraft can be estimated based on alternating current (AC) components of outputs of solar cells in the solar cell array. Estimating the bearing may include determining respective amplitudes of the AC components; comparing the respective amplitudes of the AC components; and estimating the bearing based on the respective amplitudes of the AC components. It can also include determining respective in-phase and quadrature (IQ) components of the AC components; determining differences between the respective IQ components; and estimating the bearing based on the differences between the respective IQ components.

Another spacecraft can locate a femto-satellite by scanning an electromagnetic beam across a portion of outer space containing the femto-satellite. The spacecraft receives an acknowledgement from the femto-satellite in response to detecting the electromagnetic beam. This acknowledgement can indicate or include a time stamp associated with the electromagnetic beam. The spacecraft determines a pointing angle of the electromagnetic beam associated with the time stamp and estimates a position of the femto-satellite relative to the spacecraft based on the pointing angle of the electromagnetic beam.

The spacecraft may receive the acknowledgement by detecting a portion of the electromagnetic beam retroreflected from the femto-satellite, in which case the spacecraft can estimate a range from the spacecraft to the femto-satellite based on a round-trip time of flight of the electromagnetic beam between the femto-satellite and the spacecraft. The spacecraft can also receive the acknowledgement by detecting a radio-frequency (RF) signal from the femto-satellite in response to detecting the electromagnetic beam.

In some cases, the spacecraft can modulate the electromagnetic beam with a command for the femto-satellite. It can also modulate the electromagnetic beam with successive time stamps while scanning the electromagnetic beam, in which case the acknowledgement includes a time stamp received by the femto-satellite and estimating the position of the femto-satellite relative to the spacecraft comprises matching the pointing angle of the electromagnetic beam to the time stamp. The spacecraft can estimate a distance from the spacecraft to the femto-satellite based at least in part on a time of flight of the electromagnetic beam to the femto-satellite.

The electromagnetic beam can be an optical beam, in which case a solar cell on the femto-satellite can detect the optical beam. The solar cell's output can be filtered into a DC component and an AC component, with the DC component powering an electronic component of the femto-satellite and a command encoded in the AC component actuating a sensor of the femto-satellite.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally and/or structurally similar elements).

DETAILED DESCRIPTION

Figure 1A:
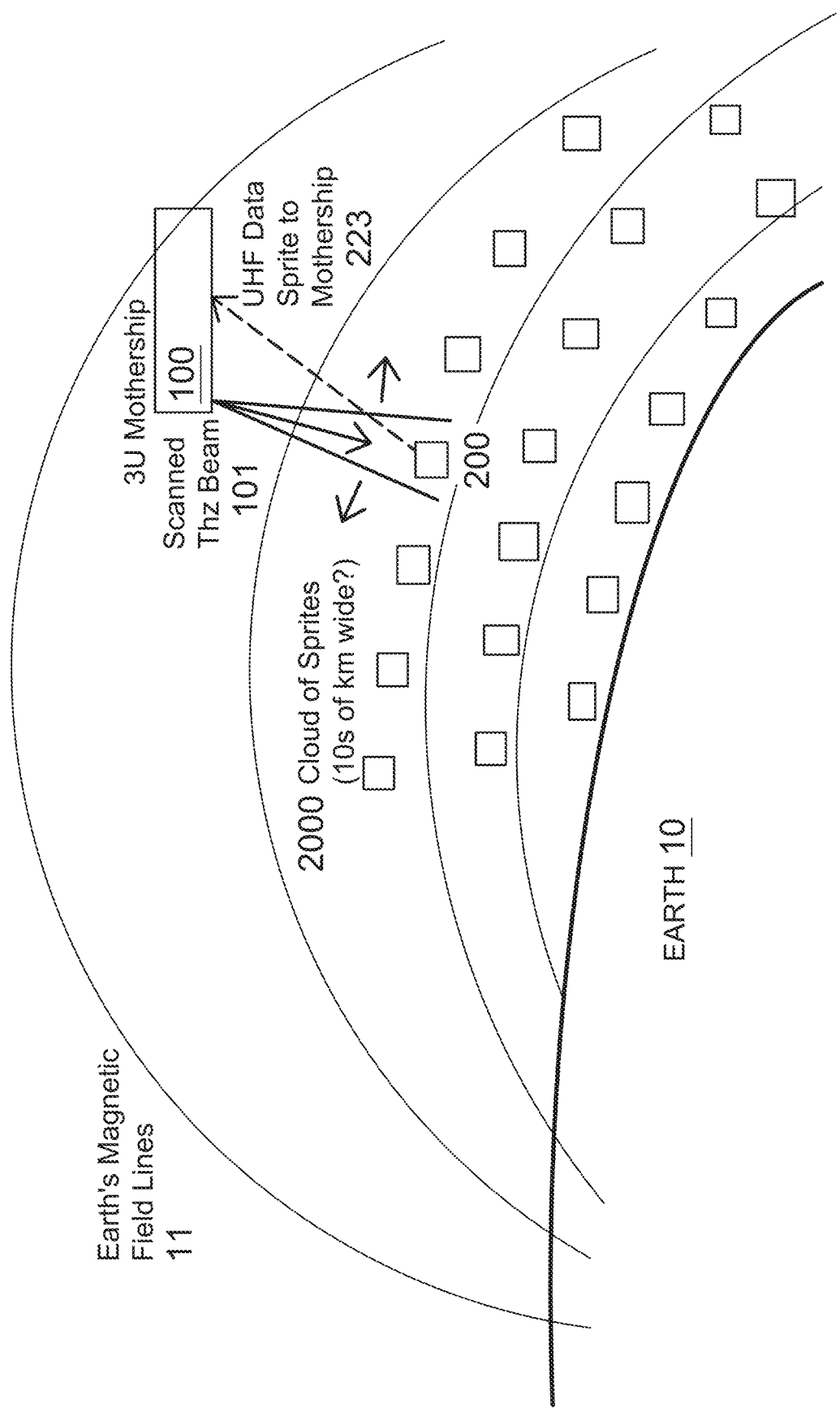
FIG. 1A illustrates a mothership satellite illuminating a femto-satellite (sprite) in a constellation of femto-satellites (cloud of sprites) with a scanning electromagnetic (e.g., terahertz) beam and the femto-satellite transmitting a response to the mothership satellite via an ultra-high frequency (UHF) radio link or other suitable communication channel.

FIG. 1A provides an overview of how a mothership satellite 100 or other spacecraft can locate a femto-satellite 200 by scanning a beam of pulsed or continuous-wave electromagnetic radiation 101 across a region of space containing the femto-satellite 200. This localization technology is particularly useful for use with a distributed constellation of femto-satellites. Localizing these femto-satellites precisely enables them to make precisely localized measurements with high spatial diversity. These abilities are potentially useful in surveys of Earth's magnetic field 11, the natural or artificial radiation environment of space, or the radio-frequency (RF) environment. They may also find use in locating internet-of-things (IoT) devices, for example, network-enabled appliances or domotics sensors in a Li-Fi network.

Before the femto-satellites 200 are localized, they are deployed as follows, starting with launching the mothership satellite 100 into orbit. Once in orbit, the mothership satellite 100 deploys one or more femto-satellites 200, for example, into a constellation or swarm 2000 in the desired orbit(s). This orbit may be the same as the target orbit of the mothership satellite 100 from which they are deployed or different if the appropriate orbital maneuvers can be achieved. One or more of the femto-satellites 200 can be deployed from spacecraft other than the mothership satellite 100.

Each femto-satellite 200 is small (e.g., with a wet mass of less than 100 grams) and may not include any navigation components or subsystems. In particular, the femto-satellites 200 may not have GNSS receivers because GNSS receivers tend to be heavy (e.g., 30% or more of the femto-satellite's mass) and consume relatively high amounts of power. Once the femto-satellites 200 have been deployed, the mothership satellite 100 or another spacecraft scans or sweeps a narrow beam of electromagnetic radiation 101 across the constellation of femto-satellites 2000. The mothership satellite 100 may scan this electromagnetic beam 101 in a predetermined pattern, such as a raster scan pattern, at a predetermined rate. The mothership satellite 100 can also step or point the electromagnetic beam 101 through a series of discrete predetermined angles or at each a series of discrete positions.

The electromagnetic beam 101 can be an optical beam generated by a laser and steered with a scanning mirror, optical phased array, tunable grating, or other beam-steering element. It can be a terahertz (THz) beam generated with a terahertz source and steered with a terahertz beam-steering element, such as a THz phased array. Or it can be an RF (e.g., millimeter-wave or microwave) beam scanned with an RF phased array or scanning antenna. The wavelength of the electromagnetic beam determines in part the achievable spatial and/or angular resolution of the femto-satellite's estimated position, with shorter wavelengths generally providing finer spatial and angular resolution.

In any case, a modulator on the mothership satellite 100 can modulate the amplitude, frequency, and/or phase of the electromagnetic beam 101 with commands for the femto-satellite (e.g., a "wake-up" command, a query for information, etc.). The modulator can also modulate the electromagnetic beam 101 with contemporaneous time stamps as well as information about the mothership satellite's absolute position, position relative to another object (e.g., another spacecraft), instantaneous pointing angle of the electromagnetic beam 101, scan rate, and/or scan pattern that traced out by the electromagnetic beam 101. For instance, the modulator 100 may modulate the electromagnetic beam 101 with information encoding a series of time stamps and optionally with the pointing angles at those time stamps. The mothership satellite 100 and/or femto-satellite 200 can use this information to estimate the femto-satellite's position with respect to the mothership satellite 100 and/or the femto-satellite's absolute position as explained below The beam of electromagnetic radiation 101 can activate a particular femto-satellite 200 to either make a measurement, transmit data, or both. When the beam of electromagnetic radiation 101 illuminates the femto-satellite 200, the femto-satellite 200 responds by sending an acknowledgment back to the mothership satellite 100. For instance, the femto-satellite 200 can retroreflect a portion of the electromagnetic beam 101 back to the mothership satellite 100, in which case the mothership satellite 100 can determine the direction to the femto-satellite 200 from the pointing angle and time stamp modulated onto the retroreflected electromagnetic beam 101. Alternatively, or in addition, the femto-satellite 200 can acknowledge the electromagnetic beam 101 by detecting and demodulating the electromagnetic beam 101 and transmitting an acknowledgement to the mothership satellite 100 via a separate communications channel, such as an ultra-high frequency (UHF) channel 223, as shown in FIG. 1A. This acknowledgement may include the time stamp and/or pointing angle modulated onto the electromagnetic beam 101 and/or a time stamp indicating when the femto-satellite received the electromagnetic beam 101.

In either case, the mothership satellite 100 receives the acknowledgement from the femto-satellite and uses it to determine the direction, bearing, or angle from the mothership satellite 100 to the femto-satellite 200. If the acknowledgement includes the pointing angle or other pointing information modulated onto the electromagnetic beam 101 when the electromagnetic beam 101 illuminated the femto-satellite 200, then the mothership satellite 100 can use that information to estimate the direction or angle from the mothership satellite 100 to the femto-satellite 200. If the acknowledgement includes a time stamp indicating when the femto-satellite 200 detected the electromagnetic beam 101, then the mothership satellite 100 can look up the corresponding pointing angle of the electromagnetic beam 101 in its memory and use that pointing angle to estimate the direction to the femto-satellite 200.

In some cases, the femto-satellite 200 can also estimate the direction or bearing to the mothership satellite 100 from the information modulated onto the electromagnetic beam 101. If the electromagnetic beam 101 is modulated with its pointing angle, for example, then a processor on board the femto-satellite 200 can demodulate and use that information to estimate the bearing to the mothership satellite 100. The femto-satellite 200 can transmit this estimate back to the mothership satellite 100 or to another receiver in space or on the ground via the separate channel 223. It can also use this information to process data collected by on-board sensors.

The mothership satellite 100 can also estimate the range to the femto-satellite 200 based on the round-trip time-of-flight of the electromagnetic beam 101 to and from the femto-satellite 200. To see how, consider a pulsed electromagnetic beam 101, with each pulse modulated by a time stamp indicating when the mothership satellite 100 transmitted that pulse according to a clock on the mothership satellite 100. If the femto-satellite 200 retroreflects the pulse back to the mothership satellite 100, then the mothership satellite 100 detects the retroreflected pulse, recovers the time stamp, and compares the time stamp to the current time on the clock. If the femto-satellite 200 transmits an acknowledgement via a separate channel (e.g., UHF channel 223), then it can include the time stamp in the acknowledgement, possibly with a measurement or estimate of the latency or additional delay associated with detecting and re-transmitting the time stamp. The difference between the current time and the time stamp is the round-trip time-of-flight between the mothership satellite 100 and the femto-satellite 200. The product of the round-trip time-of-flight (less any non-propagation) latency or delay) and the pulse's propagation speed (the speed of light) is the range from the mothership satellite 100 to the femto-satellite 200.

The mothership satellite 100 can determine the range and direction to the femto-satellite 200 from the same pulse or from separate pulses. If the mothership satellite 100 determines the direction or bearing to the femto-satellite 200 from a first (modulated) pulse, then it can determine the range to the femto-satellite 200 using a second (unmodulated), retroreflected pulse by measuring the time between transmitting the second pulse and receiving the retroreflection.

By measuring the bearing and distance of the femto-satellite 200 relative to the mothership satellite 100, it is possible to calculate the femto-satellite's position relative to the mothership satellite 100. And if the mothership satellite's absolute position is known, it is possible to calculate the femto-satellite's absolute position based on its position relative to the mothership satellite 100 and the mothership satellite's absolute position.

Figure 1B:
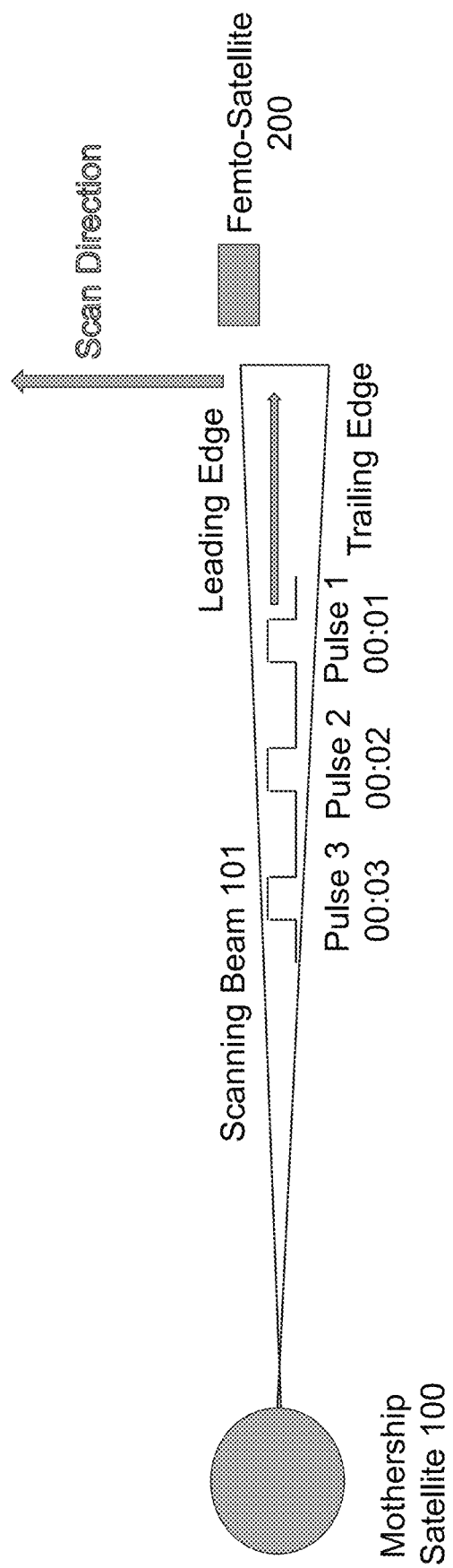
FIG. 1B illustrates a scanning beam from a mothership satellite sweeping across a femto-satellite.

FIG. 1B illustrates the scanning beam 101 as it sweeps across the femto-satellite 200. Given the range from the mothership satellite 100 to the femto-satellite 200 and the size of the antenna or optics used to generate the scanning beam 101, the diameter of the scanning beam 101 is generally larger than the largest lateral dimension of the femto-satellite (and of its solar cells). To make a more precise angular measurement, then, the scanning beam 101 may have a top hat-like spatial amplitude profile with sharp leading and trailing edges. The femto-satellite 200 can detect the leading and trailing edges to provide a better indication of when the illumination by the beam 101 started, how long the illumination lasted, and when the illumination ended. If the divergence angle and angular scan rate of the electromagnetic beam 101 are known or can be estimated or measured, these times can be used to estimate the diameter of the electromagnetic beam 101 and the range from the mothership 100 to the femto-satellite 200. Assuming that the femto-satellite 200 is in the far field, the diameter of the beam is proportional to the produce of the range and the divergence angle.

If desired, the scanning beam 101 can be pulsed, modulated, or both to aid in activating the femto-satellite 200 and/or estimating the range and bearing from the mothership satellite 100 to the femto-satellite 200. In FIG. 1B, the scanning beam 101 is shown including three pulses 1-3, each of which is emitted at a different time. Each pulse can be modulated with a time stamp (e.g., 00:01, 00:02, and 00:003) indicating when it was sent by the mothership satellite 100. If the mothership satellite 100 keeps records of the pointing angle of electromagnetic beam 101 at each time stamp, the time stamp(s) detected by the femto-satellite 200 can be used to determine the pointing angle from the mothership satellite 100 to the femto-satellite 200.

The pulses can also be used to estimate the range from the mothership satellite 100 to the femto-satellite 200. For example, if the period between pulses is longer than the time it takes for a pulse to propagate from the mothership satellite 100 to the femto-satellite 200 and back, then the mothership satellite 100 can measure the range to the femto-satellite 200 by timing the round-trip propagation time for a pulse and multiplying that propagation time by the pulse speed.

Mothership Architecture

Figure 1C:
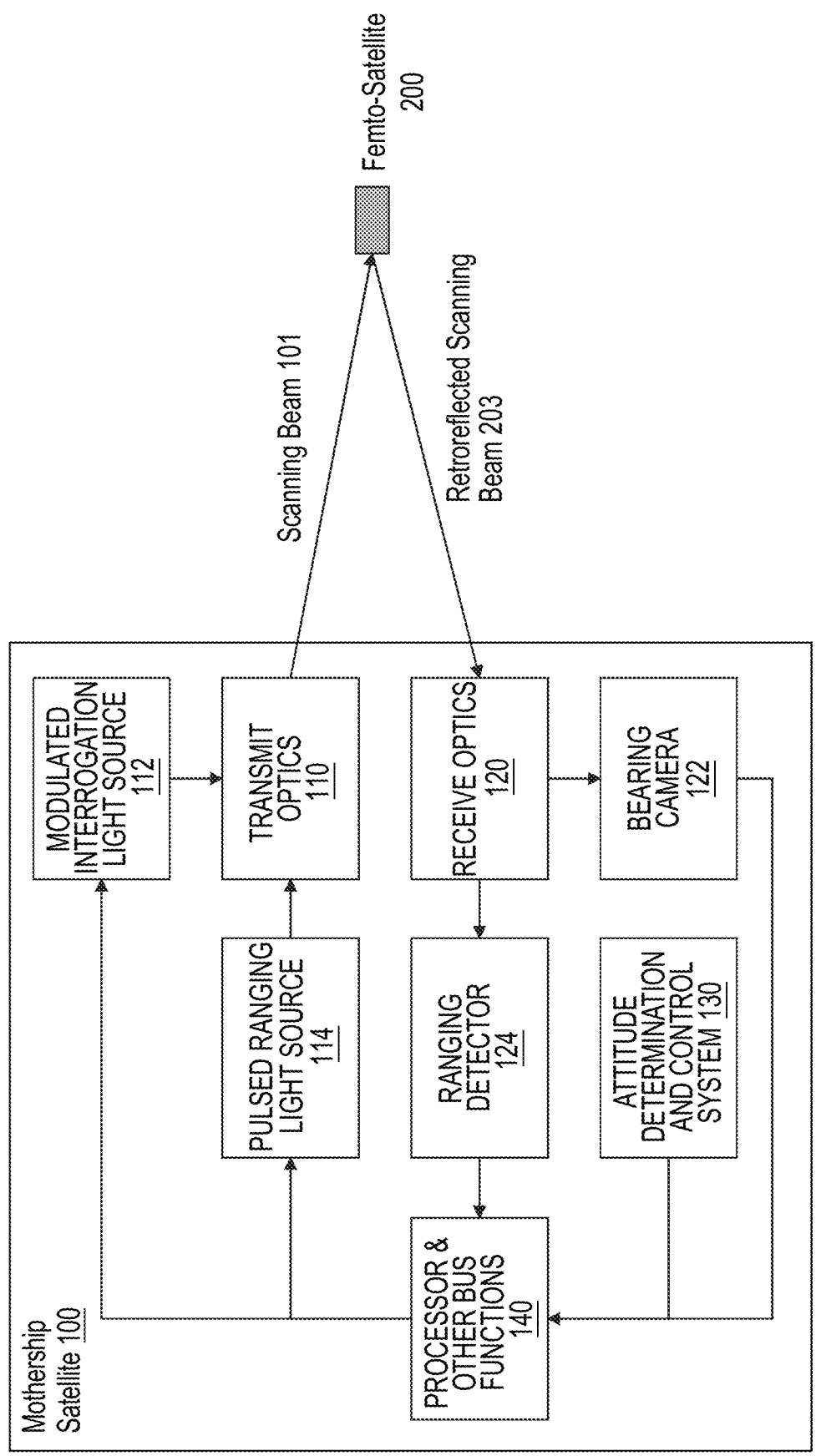
FIG. 1C is a block diagram of the mothership satellite in FIGS. 1A and 1B.

FIG. 1C is a block diagram that shows some elements of the mothership satellite 100. The mothership satellite 100 includes either a modulated laser or other light source 112 for "waking up" femto-satellites 200, a pulsed laser or other pulsed light source 114 for ranging, or both. The pulsed source 114 has a high duty cycle and can emit a ranging signal. Data can be encoded in the ranging signal by absence or presence of pulses, or the time between pulses. The interrogation light source 112 is modulated with a signal whose narrow bandwidth matches the bandwidth of the amplifier on the femto-satellite 200. Data can be encoded in the phase of the modulated signal. Transmit optics 110, such lenses for focusing and/or collimating the beam, MEMS mirrors for beam steering, beam splitters from combining or splitting beams, and/or other optical components, scan light from the modulated light source 112 and/or the pulsed light source 114 across an area of space containing the femto-satellite 200 as the scanning beam.

The mothership satellite 100 can also include receive optics 120 (e.g., lenses, mirrors, beam splitters, and/or other components) for collecting light 203 reflected or transmitted by the femto-satellite 200 to the mothership satellite 100. The transmit optics 110 and receive optics 120 may be combined into a single optical system and can share an aperture on the mothership satellite 100. The receive optics 120 couple the received light 203 to a bearing camera 122, which can estimate the angular position of the femto-satellite 200 with respect to the mothership satellite 100, and/or to a ranging detector 124, which times the arrival of (retro) reflected pulses. The transmit optics 110 and receive optics 120 can be pointed toward or scanned across the femto-satellite 200 with a combination of body-pointing of the whole mothership satellite 100; a gimbal for the optical system; or steering mirrors in the transmit optics 110 and receive optics 120.

An attitude determination and control system 130 determines and controls the orientation of the mothership satellite 100. It is controlled by a processor or controller 140 (e.g., an MCU), which monitors or sets the mothership satellite's position and orientation, controls the light sources 112 and 114, and determines the range and (relative and/or absolute) bearing of the femto-satellite 200 based on signals from the bearing camera 122 and the ranging detector 124.

Femto-Satellite Architecture

Figure 2A:
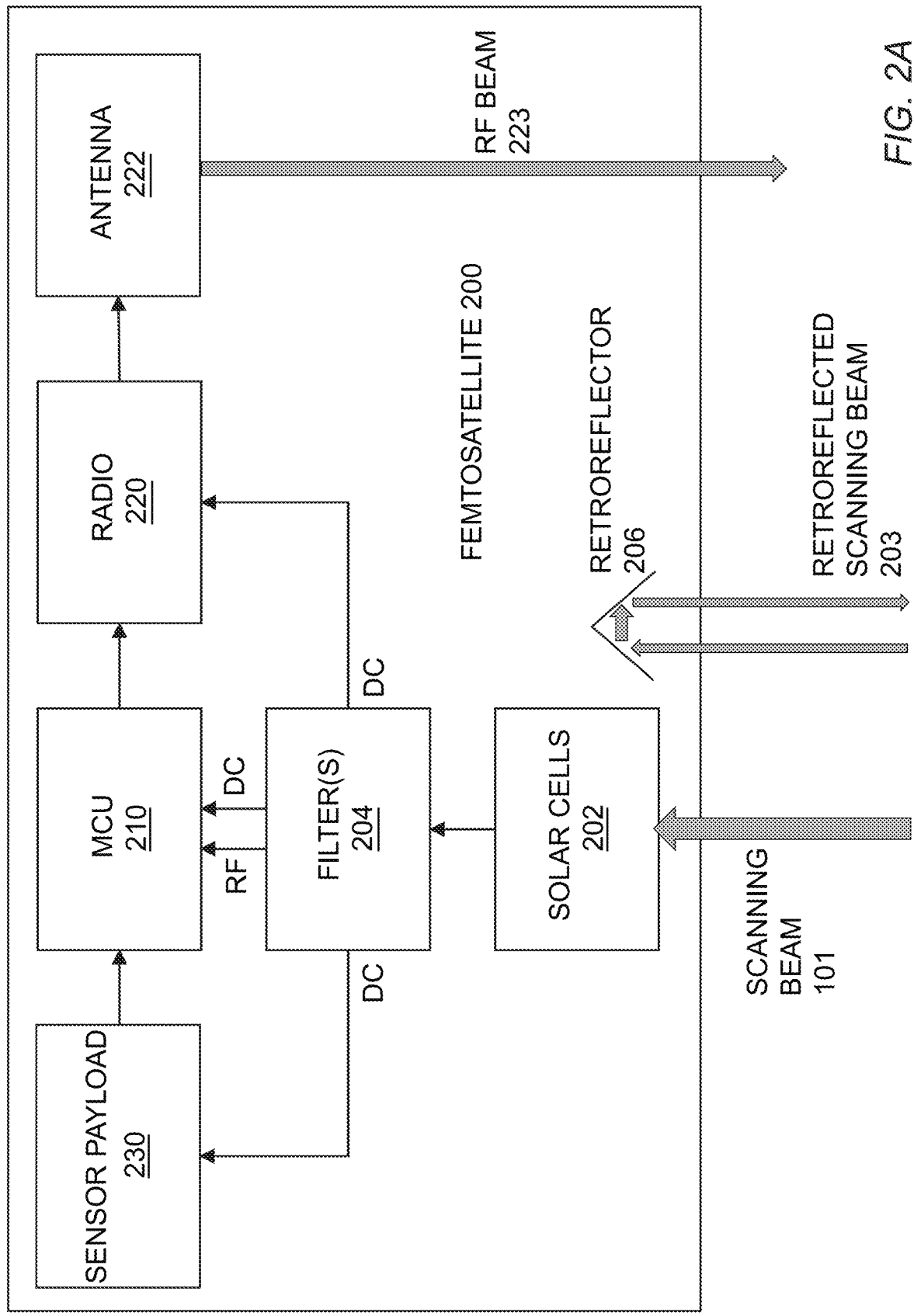
FIG. 2A is a block diagram of a femto-satellite configured to receive and respond to a scanning electromagnetic beam from a mothership satellite or other spacecraft.
Figure 2B:
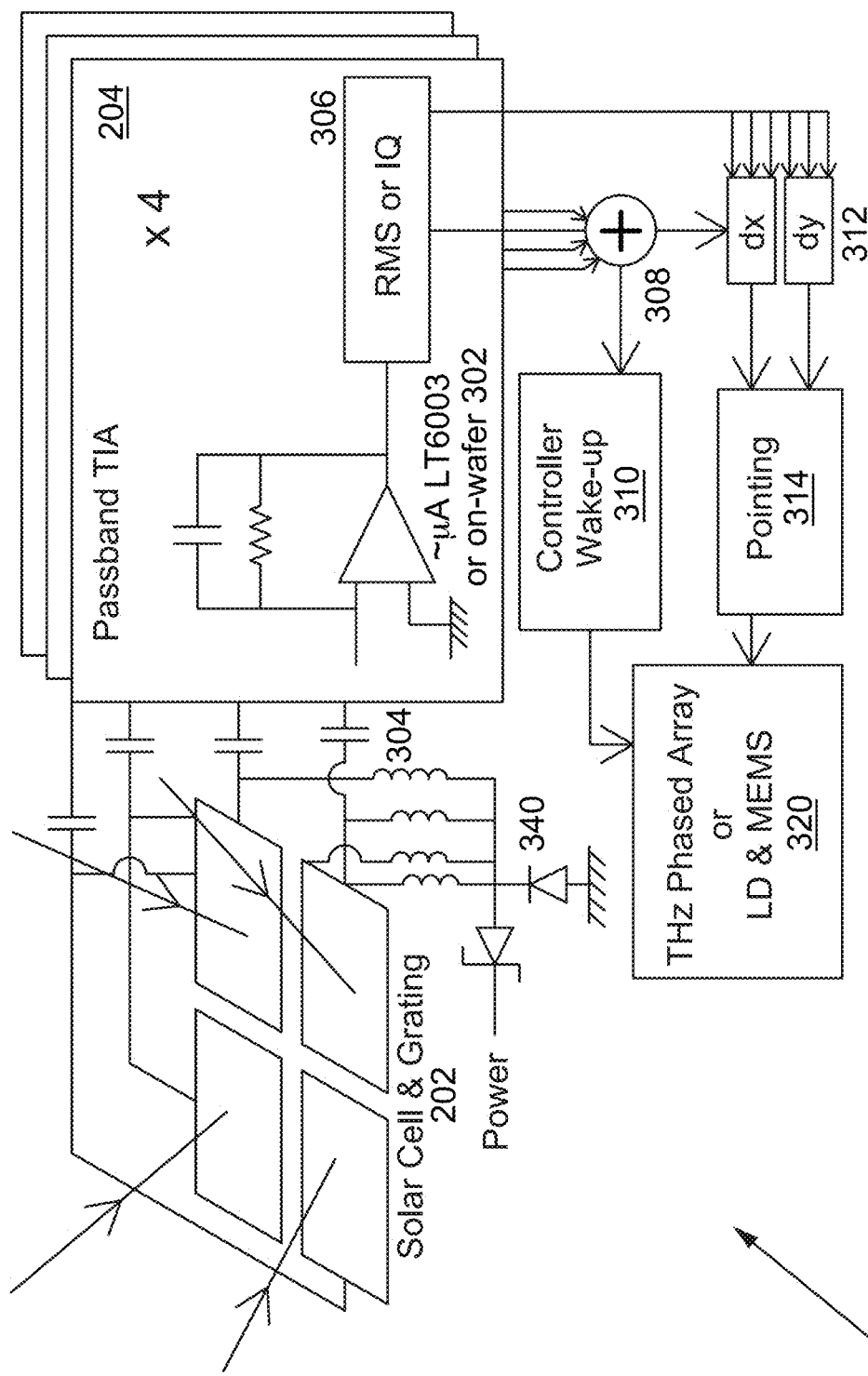
FIG. 2B illustrates an implementation of a femto-satellite architecture for receiving and responding to a scanning electromagnetic beam from a mothership satellite or other spacecraft.

FIGS. 2A and 2B illustrate different aspects and implementations of the femto-satellite 200 in FIG. 1A. FIG. 2A shows a block diagram of the femto-satellite 200, which includes solar cells 202, optional filter(s) 204, a microcontroller unit (MCU) 210 or other processor or controller, a radio 220 and antenna 222, sensor payload 230, and an optional retroreflector 206. The solar cells 202 are coupled to and power the MCU 210, radio 220, sensor payload 230, and other electronics by converting incident sunlight and other optical radiation into electricity. The solar cells 202 can also detect the scanning beam 101 from the mothership satellite 100 (FIG. 1A) if the scanning beam 101 is an optical scanning beam. If the optical scanning beam is modulated, the solar cells 202 produce an output that includes both a low-frequency or direct current (DC) component for power the electronics and a higher-frequency or alternating current (AC) component with the modulation. The filter 204, which can be implemented as a bias tee, separates the AC and DC components and directs the DC component to power-conditioning circuitry for power the electronics. The filter 204 also directs the AC component to the MCU 210 for processing.

The MCU 210 receives and responds to the signals modulated onto the scanning beam. These signals can include commands for the femto-satellite 200, including commands to make measurements with the sensors in the sensor payload 230, transmit data acquired by the sensors in the sensor payload 230 and stored in memory on the femto-satellite, or transmit other information, including health, safety, and/or other status information. The MCU 210 responds to these commands by triggering the appropriate sensor or the radio 220.

The signals modulated onto the optical scanning beam may also include time stamps and/or pointing information as described above. The MCU 210 can use this information to determine or estimate the femto-satellite's absolute or relative position. It can also transmit the time stamp and/or pointing information, the estimated position, or both back to the mothership satellite 100 and/or other one or more receivers via the radio 220 and the antenna 222. If the antenna 222 is a phased array, it can steer the transmission to point along a reciprocal heading to the pointing direction of the scanning beam from the mothership satellite.

The femto-satellite 200 may also include a corner-cube retroreflector or cat's eye retroflector 206 pointing in the same direction as the solar cells 202. The retroreflector 206 reflects incident radiation back to its source with little to no scattering. If the incident radiation is a modulated optical scanning beam from a mothership satellite or other spacecraft, then the retroreflector 206 reflects the modulated optical scanning beam back to the mothership satellite or other spacecraft. This simplifies the locating process from the femto-satellite's perspective; the scanning beam does not have to be detected or used to trigger a radio transmission. It also eliminates any latency associated with detecting and processing the optical scanning beam at the femto-satellite, possibly increasing the accuracy of a time-of-flight range measurement. In fact, with the retroreflector 206 to reflect a modulated optical scanning beam, the femto-satellite can be located even if it is off (unpowered).

FIG. 2B shows a more detailed view of the solar cells 202 and associated circuitry in the femto-satellite 200. The solar cells 202 and associated circuitry can receive an optical scanning beam from a mothership satellite and determining the vector relative to the femto-satellite from which the optical beam originated. FIG. 2B also depicts a system by which the optical beam can trigger the femto-satellite to wake-up (become active) and transmit a return signal to the mothership satellite along the incident vector by means of a terahertz phased array or laser diode (LD) and microelectromechanical systems (MEMS) mirror 320. Using the femto-satellite's solar cells 202 as sensors to wake the femto-satellite 200 offers a strong size or performance advantage. A separate detector of similar performance would take up an area similar in size to the solar cells 202.

In this example, there are four solar cells 202 in the solar cell array. The solar cells 202 receive both a DC or low-frequency power component from the sun and higher-frequency AC content from the activation signal from the mothership satellite. For example, the activation signal can use a sub-modulation so that it can be filtered or separated from sunlight and Earth background light.

Each solar cell 202 is coupled to a separate filter 204. In FIG. 2A, these filters 204 are implemented as transimpedance amplifiers (TIAs) 302 combined with respective bandpass filters 304. The signal from each filter 204 goes through the receiving circuit with frequency filtering, and the amplitude is extracted with another circuit 306, either using in-phase and quadrature (IQ) demodulation, peak detection, or root-mean-square (RMS) detection. A summing node 308 combines the RMS amplitudes of the filtered, amplified solar cell outputs. The summed outputs are processed with a wake-up controller 310 or another processor. If desired, the circuits receiving the signals on the femto-satellite 200 can be tuned to be sensitive to a specific sub-modulation frequency range in order to select that femto-satellite 200 to wake up.

IQ demodulation offers the advantage of a slow data link from the carrier to the femto-satellite 200 using the phase of the sub-modulation, at the cost of added complexity. Circuitry 312 and 314 uses differences between the IQ components to determine the pointing angle of the solar cells 202 with respect to the mothership satellite. In other words, the power received by solar cells 202 depends on the angle of incidence of the incoming light. This is also true for the signal power that the solar cells 202 receive from the mothership. Three or more cells can be used to determine the bearing of the mothership satellite from the femto-satellite 200. The direction along which the solar cells 202 receive the most power may be skewed in order to make the bearing observable. This can be achieved by orienting the solar cells 202 themselves in different directions, using an optical grating at the surface of each solar cell 202, or adapting the cell surface texturing.

Solar Cells and Gratings for Femto-Satellites

Figure 3A:
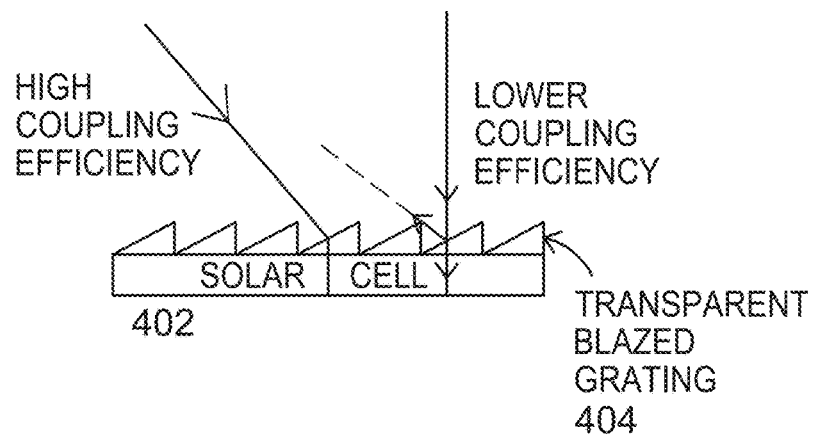
FIG. 3A illustrates a side view of a solar cell and transparent grating in the femto-satellite architecture implementation of FIG. 2B.
Figure 3B:
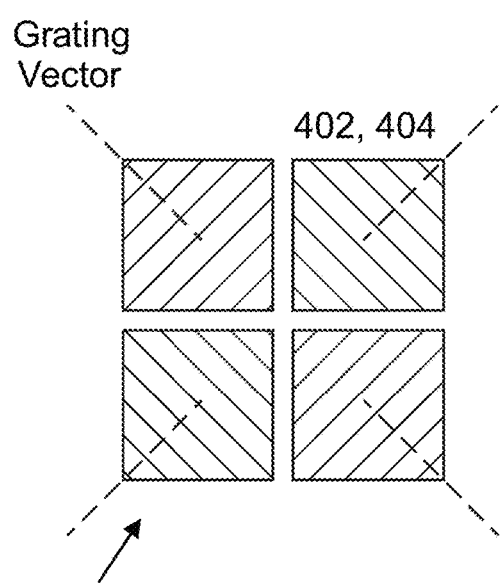
FIG. 3B is a plan view of the solar cell/grating alignment in the solar cell array of FIG. 2B.
Figure 3C:
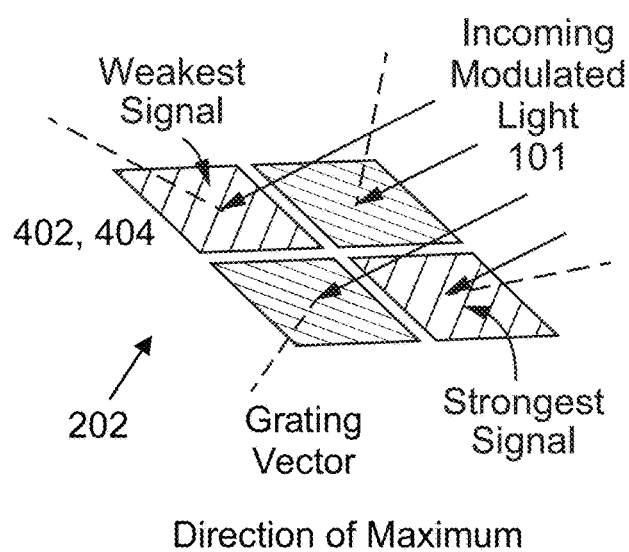
FIG. 3C is a perspective view of the solar cell/grating alignment in the solar cell array of FIG. 2B.

FIGS. 3A-3C illustrate one implementation of the femto-satellite's solar cell array 202 and gratings in greater detail. FIG. 3A shows one solar cell 402 and one grating 404 in profile. The grating 404 is blazed and has a diffraction efficiency that varies with incidence angle. In the configuration shown in FIG. 3A, the grating's diffraction efficiency is higher off-axis than at normal incidence, leading to lower coupling efficiency for on-axis beams than off-axis beams. The grating 404 changes the coupling efficiency of the solar cell 402, with the highest coupling efficiency now achieved at a skewed angle (not normal incidence). This variation in coupling efficiency with incidence angle can be used to determine the incidence angle of the scanning beam 101 as explained below.

FIGS. 3B and 3C show the 4×4, square array 202 of solar cells 402 and gratings 404. Each solar cell 402 has its own grating 404. The solar cells 402 are arranged in the array 202, on the surface the femto-satellite 200, with gratings pointing in different directions. In this example, each grating's grating vector (the direction perpendicular to that grating's rulings) points to the corresponding corner of the square array 202. The gratings 404 modulate the coupling efficiency and hence the received optical power as a function of incidence angle. If the scanning beam 101 is aligned with a particular grating vector, then the corresponding solar cell 402 will produced the highest output (strongest signal), even if all of the solar cells 402 are illuminated uniformly. Conversely, the solar cells 402 whose grating vectors are not aligned with the scanning beam 101 will produce weaker signals, e.g., as in FIG. 3C, where the lower right and upper left solar cells produce the strongest and weakest signals, respectively. The femto-satellite 200 and/or mothership satellite 100 can use the difference(s) in amplitudes among the solar cell outputs to estimate the instantaneous pointing direction of the scanning beam 101. If the incident light has a non-uniform spatial amplitude profile, the solar cell surface can be further sub-divided, with several bare sections (sections without gratings) being used to estimate the light intensity distribution.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A femto-satellite comprising:
    a solar cell array to convert incident solar radiation into direct current (DC) components and to convert an electromagnetic beam from a spacecraft into alternating current (AC) components;
    filters, operably coupled to respective solar cells in the solar cell array, to separate the DC components from the AC components; and
    circuitry, operably coupled to the filters, to detect the AC components and to activate at least one electronic component of the femto-satellite in response to the solar cell array receiving the electromagnetic beam from the spacecraft.

2. The femto-satellite of claim 1, wherein the at least one electronic component comprises a radio to transmit an acknowledgement of the electromagnetic beam to the spacecraft.

3. The femto-satellite of claim 1, wherein the at least one electronic component comprises a sensor to make a measurement in response to the electromagnetic beam.

4. The femto-satellite of claim 1, wherein the circuitry is configured to estimate a bearing from the femto-satellite to the spacecraft based on the AC components.

5. The femto-satellite of claim 1, further comprising:
    a retroreflector to retroreflect at least a portion of the electromagnetic beam back to the spacecraft.

6. A method of operating a femto-satellite, the method comprising:
    receiving, by a solar cell array on the femto-satellite, an electromagnetic beam scanned by a spacecraft across a portion of outer space containing the femto-satellite;
    activating at least one electronic component of the femto-satellite in response to the solar cell array receiving the electromagnetic beam; and
    transmitting, by the femto-satellite, an acknowledgement of the electromagnetic beam to the spacecraft.

7. The method of claim 6, wherein transmitting the acknowledgement comprises retroreflecting at least a portion of the electromagnetic beam to the spacecraft.

8. The method of claim 6, wherein transmitting the acknowledgement comprises transmitting at least one of a radio-frequency signal, a terahertz signal, or an optical signal from the femto-satellite to the spacecraft.

9. The method of claim 6, further comprising:
    estimating a bearing from the femto-satellite to the spacecraft based on alternating current (AC) components of outputs of solar cells in the solar cell array.

10. The method of claim 9, wherein estimating the bearing comprises:
    determining respective amplitudes of the AC components;
    comparing the respective amplitudes of the AC components; and estimating the bearing based on the respective amplitudes of the AC components.

11. The method of claim 9, wherein estimating the bearing comprises:
   determining respective in-phase and quadrature (IQ) components of the AC components;
   determining differences between the respective IQ components; and
   estimating the bearing based on the differences between the respective IQ components.

12. The method of claim 6, further comprising:
   actuating a sensor on the femto-satellite in response to the solar cell array receiving the electromagnetic beam.

13. The method of claim 6, wherein receiving the electromagnetic beam comprises coupling the electromagnetic beam to the solar cell array with a plurality of gratings, each grating in the plurality of gratings being disposed on a different solar cell in the solar cell array and having a grating vector pointing in a different direction.

14. The method of claim 6, wherein further comprising:
   decoding, at the femto-satellite, a timestamp and information about a pointing angle of the electromagnetic beam encoded in the electromagnetic beam; and
   determining, by the femto-satellite, a position of the femto-satellite with respect to the spacecraft based on the timestamp and the information about the pointing angle of the electromagnetic beam.

15. The method of claim 6, further comprising:
   decoding, at the femto-satellite, a wake-up command encoded in the electromagnetic beam.

16. The method of claim 6, further comprising:
   estimating a pointing angle of the electromagnetic beam based on differences in amplitudes of outputs of different solar cells in the solar cell array.

17. The method of claim 6, further comprising:
   filtering an output of the solar cell array into direct current (DC) components and alternating current (AC) components;
   directing the DC components to power-conditioning circuitry for powering electronics of the femto-satellite; and
   directing the AC components to a micro-controller unit for processing.

18. The femto-satellite of claim 1, wherein the filters comprise one filter per solar cell in the solar cell array.

19. The femto-satellite of claim 1, wherein the filters are configured to direct the DC components to power-conditioning circuitry for powering electronics of the femto-satellite and to direct the AC component to a micro-controller unit for processing.

20. The femto-satellite of claim 1, further comprising:
   a plurality of gratings, each grating in the plurality of gratings being disposed on a different solar cell in the solar cell array and having a grating vector pointing in a different direction.

* * * * *